United States Patent [19]

Haugland

[11] Patent Number: 4,683,473

[45] Date of Patent: Jul. 28, 1987

[54] RADAR TRANSIT TIME SIMULATOR DEVICE

[75] Inventor: James R. Haugland, Hennepin, Minn.

[73] Assignee: Honeywell Inc., Minneapolis, Minn.

[21] Appl. No.: 817,642

[22] Filed: Jan. 10, 1986

[51] Int. Cl.⁴ .............................................. G01S 7/40
[52] U.S. Cl. ........................................ 342/172; 342/15
[58] Field of Search .............................. 342/120–122, 342/169–174, 15; 434/1, 2, 5

[56] References Cited

U.S. PATENT DOCUMENTS

| | | | |
|---|---|---|---|
| 2,505,525 | 4/1950 | Clapp et al. | 342/172 |
| 2,781,511 | 2/1957 | Pear, Jr. | 342/172 |
| 2,788,520 | 4/1957 | Arenberg et al. | 342/172 |
| 2,922,157 | 1/1960 | McShan | 342/171 |
| 3,018,478 | 1/1962 | Skillman et al. | 342/171 |
| 3,160,882 | 12/1964 | Stimler et al. | 342/172 |
| 3,354,457 | 11/1967 | Pfab et al. | 342/172 |
| 3,400,384 | 9/1968 | Hildebrandt | 365/76 |
| 4,121,213 | 10/1978 | Bush et al. | 342/172 |
| 4,173,003 | 10/1979 | Thies | 333/165 |
| 4,319,247 | 3/1982 | Warren | 342/172 X |

Primary Examiner—T. H. Tubbesing
Assistant Examiner—Bernarr Earl Gregory
Attorney, Agent, or Firm—George A. Leone, Sr.

[57] ABSTRACT

A device for imparting a selected delay to a pulse emanating from a transmitter before the pulse is returned as a simulated radar echo to a radar altimeter receiver. The selected delay is obtained by recirculating the transmitted pulse through a fixed delay element a prescribed number of times. The system includes a control circuit, including a single-pole, double-throw electronic switch coupled to a presettable counter which may be preloaded with a count value corresponding to the number of iterations of the transmitted pulse through a closed loop including the delay elements. Upon each such traversal, the counter is decremented and when the counter generates a borrow signal, the electronic switch diverts the pulse to the altimeter's receiver. The recirculation loop also includes pulse amplifying and shaping circuitry for compensating for attenuation and distortion of the recirculating pulse.

11 Claims, 1 Drawing Figure

RADAR TRANSIT TIME SIMULATOR DEVICE

BACKGROUND OF THE INVENTION

I. Field of the Invention

This invention relates generally to electronic apparatus, and more particularly to a system for simulating the transit time of a transmitted radar signal.

II. Discussion of the Prior Art

As those skilled in the art will appreciate, a radar altimeter for an aircraft periodically sends out a transmitted pulse and, a short time later, an echo pulse, returned from the ground, triggers a radar receiver in the aircraft. By knowing the delay time between the generation of the transmitted pulse and the receipt of the received echo pulse, the distance between the aircraft and the earth's surface can be inferred. In bench testing such a device, it is desirable to be able to simulate the transmitted pulse's time so that the altimeter may be properly calibrated.

In prior art radar test apparatus, it has been the practice to utilize a plurality of lumped constant delay lines, each with its own individual delay characteristic. These discrete devices are operatively disposed between the radar system's transmitter output and its receiver input. In this regard, reference is made to the Bush et al U.S. Pat. No. 4,121,213 which, in FIG. 1 thereof, depicts the aforementioned prior art design. Because precision calibration of radar equipment, such as radar altimeters, would require that the delay lines be carefully tailored, this adds significantly to their cost. Then, too, it is necessary to maintain an inventory of spare parts for each of the delay elements. Such fixed length acoustical delay line elements currently cost between $3,000 and $5,000 each and because an inventory of spares is usually required for each test device, a major portion of the material cost for the system is due to the number of delay lines required. This cost factor tends to limit the number of simulated altitudes that can be provided by the test equipment.

SUMMARY OF THE INVENTION

To obviate the need for multiple fixed delay elements, in accordance with the present invention, only a single-fixed length delay line is employed. To obtain differing delay intervals, the transmitted pulse is recirculated through the delay line a predetermined number of times such that the total delay experienced by the transmitted pulse equals the fixed delay interval of the delay line element multiplied by the number of times that the transmitted pulse is recirculated. Because each pass of the transmitted pulse through the recirculation path causes degradation of the transmitted pulse, compensating circuitry in the form of amplifiers and pulse shapers are also included.

To automatically determine the selected delay times, a control circuit is provided. The control circuit may conveniently comprise a presettable downcounter which may be loaded with a digital value corresponding to the desired number of passes of the transmitted pulse through the recirculation loop and means for decrementing the counter upon each traversal of the pulse through that loop. The borrow output of the downcounter is coupled to an electronic switch so that when the count is decremented to zero, a control signal is provided for "throwing" the switch to route the transmitted pulse from the recirculation loop to the receiver input terminal. Alternatively, an up-counter and a comparator may be used to issue a control signal to the electronic switches when a match results between the count in the counter and the input to the comparator.

In addition to its use in testing radar equipment, it is also contemplated that the invention may also find use in electronic radar countermeasure systems. Here, the enemy's transmitted radar pulse would be intercepted, delayed by an amount which will give the enemy a false reading of the actual target distance, and then returned to the enemy's radar receiver.

OBJECTS

It is a principal object of the present invention to provide an improved test device for a radar equipment.

Another object of the invention is to provide a test device for creating a selected delay value which uses only a single delay element.

Yet another object of the invention is to provide a radar test system incorporating a recirculating delay line with automatic control means for setting the number of iterations of a transmitted pulse through the recirculation loop before it exits that loop and is applied to the radar's receiver input terminal.

Yet still another object of the invention is to provide a radar test device incorporating a recirculating delay line for introducing a desired selected delay interval between the occurrence of a transmitted pulse and its application to the altimeter's receiver input terminal and which incorporates circuitry for compensating for degradation of the transmitted pulse in its traversal of the recirculation loop.

These and other objects and advantages of the invention will become apparent from the following detailed description of the preferred embodiment.

DESCRIPTION OF THE PREFERRED EMBODIMENT

Figure 1:
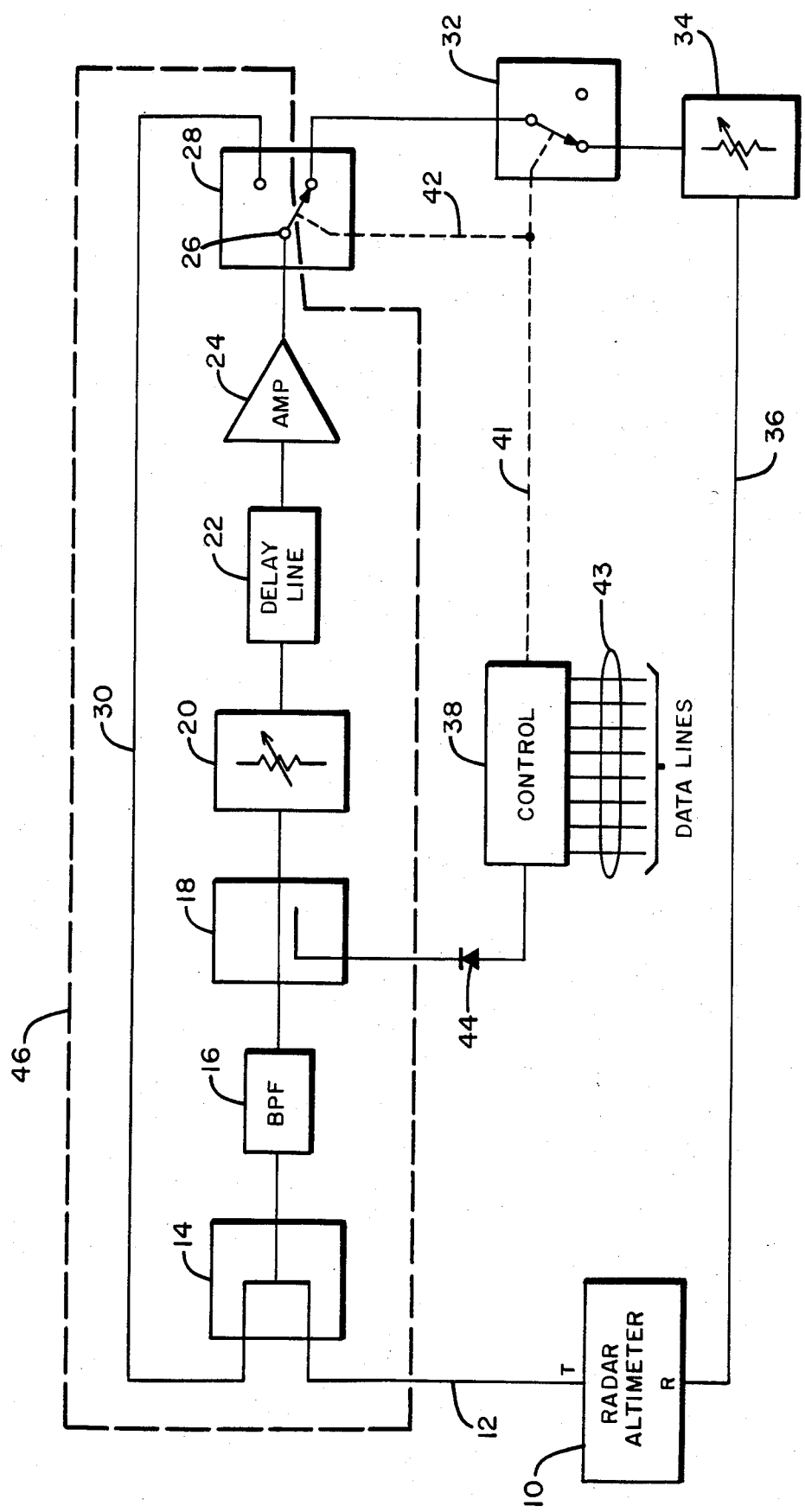
FIG. 1 is an electrical schematic diagram illustrating the best mode contemplated for carrying out the invention.

Referring to FIG. 1, numeral 10 identifies a radar altimeter receiver/transmitter with which the present invention is to be used to calibrate it at periodic intervals to insure its accuracy. The transmitted RF pulses from the radar altimeter are applied over coaxial line 12 to a power divider network 14 and thence through a band pass filter 16, a directional coupler 18, a variable attenuator 20 and a precision, fixed-length delay line element 22. The output of the delay line element 22 is then applied to a low-noise amplifier 24 whose output is fed to the pole 26 of a single-pole, double-throw electronic switch 28 which is configured to determine whether the RF pulse is to be passed through the recirculation path 30 back to the power divider 14 or whether it is to exit the loop and pass via another electronic switch 32 and a fixed attenuator 34 to the receiver input terminal of the radar altimeter 10 via line 36.

The electronic switches 28 and 32 are preferably fast PIN diode switches which are controlled from a control circuit 38 as represented by the dashed lines 41 and 42. In its simplest form, the control circuit 38 may comprise a presettable digital downcounter having preset data lines 43 for entering a count value therein. The count may be manually entered by the setting of DIP switches (not shown) or automatically in a programmed sequence by the output of a digital controller. Assuming a down counter arrangement is employed, that counter is arranged to be decremented by pulses passing through the directional coupler 18 and a diode detector 44 coupled to the "decrement count" input terminal of the downcounter. Thus, each time a transmitted pulse traverses the recirculation loop, which is shown enclosed by the broken line box 46, the count value in the down counter will be reduced by one. When ultimately the count value is reduced to zero, the borrow output from the counter is applied to the electronic switches 28 and 32 after an appropriate delay to route the recirculating pulse from the recirculation path 30 and through a variable attenuator 34 back to the receiver input terminal R of the radar altimeter device 10.

A substantial equivalent of the above implementation of the control circuit 38 would consist of the data input terminals being applied as first inputs to a digital comparator whose second inputs come from the outputs of a counter incremented by the signal from the detector 44. When a match is detected, the comparator output, after an appropriate delay, reverses the switches 28 and 32 to open the recirculating loop to allow the RF pulse to return to the receiver input terminal of the radar altimeter 10 via the attenuator 34 and line 36. The "appropriate delay" mentioned is necessary to control switches 28 and 32 to prevent the nextto-the-last RF pulse from being truncated before it is completely through the switches.

The maximum useable pulse width in the recirculating delay line is equal to the total delay of the loop minus the turn-on/turn-off delay of switches 28 and 32 and minus part of the delay through the control circuit 38 itself. The control circuit is configured to be initialized each time the system is powered-up and also each time a RF pulse first enters the recirculating delay line 46 via the power divider element 14. This will insure that the loop will remain open when no pulse is present. This serves to prevent noise accumulation and saturation of amplifier 24.

It can be seen then that the recirculating delay line can reduce to one the number of delay lines required to produce a large number of discrete delay intervals. This is to say, a pulse entering the recirculating delay line can be recirculated and delayed a predetermined number of times before leaving the loop 46. This method provides a wide range of simulated altitudes to the radar altimeter. The ranges are, of course, provided in multiples of the simulated altitude provided by the fixed delay element 22 contained within the loop.

The band pass filter 16 serves three purposes. First, it determines the useable bandwidth of the recirculating delay line. Secondly, it filters the RF switching transients introduced by the electronic switches 28 and 32 out of the recirculation loop. Finally, the band pass filter limits the excess noise in the loop which tends to reduce the noise accumulation during the recirculation process.

Concerning this last point, because of the noise figure of the amplifier 24, the noise floor in the recirculating delay loop 46 increases for each pass of the RF pulse through the recirculation loop. This tends to limit the maximum number of recirculation which can be utilized. The maximum increase in noise allowable is determined by the attenuation required of the pulse after it exits the recirculating delay line, but before it returns to the radar altimeter 10. The noise level increase in dB in the loop 46 should be less than the attenuation of the pulse occasioned by the variable attenuator element 34. The attenuator is necessitated by the fact that noise generated by the recirculating delay line must be at a level below the noise floor of the radar altimeter so as not to affect the sensitivity of that device and also from attenuation of pulses to check the sensitivity of the device. Typically, this maximum noise value would be reached prior to the saturation of the amplifier 24 in the recirculating delay line. The practical recommended limit, as presently envisioned, for the maximum number of circulation is about 30. At all times, except during the recirculation process, the switches 28 and 32 are normally positioned as shown in the schematic drawing. This allows the excess noise being accumulated during recirculation to leave the loop and to limit the possibility that the amplifier 24 will saturate.

As mentioned, the directional coupler 18 couples a portion of the RF pulse energy during each circulation to the diode detector 44. This detector provides a pulse to the control circuit 38 which keeps a count of the number of circulations. An additional benefit afforded by the band pass filter 16 is that it helps prevent the detector 44 from triggering on base band transients, which may be generated by the electronic switches 28 and 32.

The variable attenuator 20 is included so that the total gain of the recirculating loop 46 may be set to unity, i.e., 0 dB.

The delay element 22, of course, provides the major portion of the delay in the recirculating loop. Those skilled in the art will recognize, however, that the other components in the loop may also introduce small incremental elements of delay to the transmission of RF pulses therethrough.

Amplifier 24 is a low-noise amplifier that compensates for loss in the loop and provides unity gain per circulation.

The electronic switch 28 is a fast, single-pole, double-throw PIN diode switch and is the one which determines whether the RF pulse remains in the recirculation loop for another traversal or whether that pulse will exit th loop to return to the receiver input terminal of the radar altimeter. Switch 32 is a fast single-pole, single-throw PIN diode switch having high "off" isolation. The combined off isolation of switches 28 and 32, which typically is about 100 dB, prevents the radar altimeter receiver/transmitter from tracking weak pulses which may be getting through during the recirculation process.

While the invention has been described in the environment of a radar equipment test device, it may also find use in radar countermeasure equipment. Various military weapons utilize radar as a range finder. The transit time of a transmitted pulse and its return echo is used to control a gun or a missile by setting its range. It is contemplated that the circuit of FIG. 1 can introduce a delay in the return of the echo to thereby "fool" the enemy's weapon system that the target is at a range substantially different from the actual range. The received pulse from the enemy's radar would be recirculated a predetermined number of times before being returned.

While there has been shown and described a preferred embodiment of the invention, those skilled in the art will appreciate that various changes and modifications may be made to the illustrated embodiment without departing from the true spirit and scope of the invention which is to be determined from the appended claims.

What is claimed is:

1. Apparatus for simulating the transit time of a radar signal, the radar being of the type having transmitter output means for periodically generating and transmitting a burst of rf energy and receiver input means for later receiving a return of rf energy from a target, comprising:
   (a) recirculating delay line means including a fixed delay element, two terminal input means coupled to the input of said fixed delay element and a single-pole, double-throw electronic switching means having said single pole coupled to the output of said fixed delay element;
   (b) means coupling one terminal of said single-pole, double-throw electronic switching means to a first terminal of said two terminal input means;
   (c) means for coupling the other terminal of said single-pole, double-throw electronic switching means to said receiver input means;
   (d) means for coupling the transmitter output of said radar altimeter to the second terminal of said two terminal input means; and
   (e) electronic control means operatively coupled to said single-pole, double-throw electronic switching means for allowing said rf pulse to recirculate through said fixed delay element a predetermined number of times before being routed to the receiver input of said radar equipment wherein said electronic control means comprises counting means, means for coupling said counting means to said recirculating delay line means for counting the number of traversals of said rf pulse through said recirculating delay line means, means for detecting when a count reaches a predetermined value, and means responsive to said detecting means for altering the state of said single-pole, double-throw and single-pole, single-throw electronic switching means.

2. The apparatus as in claim 1 wherein said means for coupling the other terminal of said single-pole, double-throw electronic switching means to said receiver input means comprises a single-pole, single-throw electronic switching means, the state of which is controlled by said electronic control means such that when said pole of said single-pole, double-throw switching means is conductively coupled to said first terminal of said two terminal input means, said single-pole, single-throw switching means is in its non-conducting state and when said pole of said single-pole, double-throw electronic switching means is conductively coupled to said other terminal of said single-pole, double-throw electronic switching means, said single-pole, single-throw electronic switching means is in its conducting state.

3. The apparatus as in claim 2 and further including pulse attenuating means coupled in series between said single-pole, single-throw electronic switching means and said receiver input means.

4. The apparatus as in claim 1 wherein said two terminal input means comprises a power divider circuit.

5. The apparatus as in claim 4 wherein said recirculating delay line means includes pulse amplifying means and pulse shaping means coupled in series circuit with said fixed delay line element.

6. The apparatus as in claim 5 wherein said pulse shaping means comprises a band-pass filter and a pulse attenuator.

7. The apparatus as in claim 1 wherein said means for coupling said counting means to said recirculating delay line means comprises a diode detector circuit.

8. Apparatus for testing and calibrating a radar altimeter of the type having transmitter output means for periodically generating and transmitting a burst of rf energy and receiver input means for later receiving a return of said rf energy from the earth's surface by simulating the transit time of a transmitted rf pulse, comprising:
   (a) recirculating delay line means having a pair of input terminals, an output terminal, a delay path and a recirculation path;
   (b) switching means coupled to said output terminal for selectively coupling said delay path to one end of said recirculation path or to said receiver input means of said radar altimeter, said recirculation path having its other end coupled to one of said pair of input terminals, said transmitter output means being coupled to the other of said pair of input terminals; and
   (c) control means coupled to said switching means for switching said rf pulse from entering said recirculation path and to said receiver input means following a predetermined number of traversals of said rf pulse through said delay path and through said recirculation path wherein said control means comprises a presettable down-conter having a plurality of data input lines for receiving a digital count value, means for decrementing said presettable counter upon each passage of said rf pulse through said delay path, and means coupling the output of said down-counter to said switching means for decoupling said output terminal of said recirculating delay line from said recirculation path and to said receiver input terminal when the count in said down-counter reaches a predetermined value.

9. The apparatus as in claim 8 wherein said delay path includes a fixed element delay line connected in series circuit with pulse amplifying and shaping means.

10. The apparatus as in claim 8 wherein said switching means comprises a single-pole, double-throw PIN diode switch.

11. The apparatus as in claim 8 and further including attenuation means disposed between said switching means and said receiver input means.

* * * * *